United States Patent [19]

Wolf et al.

[11] Patent Number: 5,437,032
[45] Date of Patent: Jul. 25, 1995

[54] TASK SCHEDULER FOR A MILTIPROCESSOR SYSTEM

[75] Inventors: Joel L. Wolf, Katonah; Philip S. Yu, Chappaqua; John J. E. Turek, S. Nyack, all of N.Y.

[73] Assignee: International Business Machines Corporation, Armonk, N.Y.

[21] Appl. No.: 293,257

[22] Filed: Aug. 19, 1994

Related U.S. Application Data

[63] Continuation of Ser. No. 148,108, Nov. 4, 1993, abandoned.

[51] Int. Cl.⁶ .................................................. G06F 9/46
[52] U.S. Cl. ............................. 395/650; 364/DIG. 1; 364/281.4; 364/281.8
[58] Field of Search ...................................... 395/650

[56] References Cited

U.S. PATENT DOCUMENTS

| | | | |
|---|---|---|---|
| 3,648,253 | 3/1972 | Mullery et al. | 364/DIG. 1 |
| 4,318,173 | 3/1982 | Freedman et al. | 364/DIG. 1 |
| 4,633,387 | 12/1986 | Hartung et al. | 364/DIG. 1 |
| 4,638,427 | 1/1987 | Martin | 364/DIG. 1 |
| 4,642,756 | 2/1987 | Sherrod | 364/DIG. 1 |
| 4,658,351 | 4/1987 | Teng | 364/DIG. 1 |
| 4,733,347 | 3/1988 | Fukuoka | 395/650 |
| 4,748,558 | 5/1988 | Hirosawa et al. | 364/DIG. 1 |
| 4,800,521 | 1/1989 | Carter et al. | 395/650 |
| 4,805,107 | 2/1989 | Kieckhafer et al. | 364/DIG. 1 |
| 4,809,157 | 2/1989 | Eilert et al. | 364/DIG. 1 |
| 4,989,133 | 1/1991 | May et al. | 395/650 |
| 5,053,950 | 10/1991 | Naganuma et al. | 364/DIG. 1 |
| 5,109,512 | 4/1992 | Bahr et al. | 364/DIG. 1 |
| 5,115,505 | 5/1992 | Bishop et al. | 364/DIG. 1 |
| 5,121,494 | 6/1992 | Dias et al. | 364/DIG. 1 |
| 5,155,858 | 10/1992 | DeBruler et al. | 364/DIG. 1 |
| 5,220,653 | 6/1993 | Miro | 364/DIG. 1 |
| 5,241,677 | 8/1993 | Naganuma aet al. | 364/DIG. 1 |
| 5,276,879 | 1/1994 | Barry et al. | 364/DIG. 1 |

FOREIGN PATENT DOCUMENTS

| | | |
|---|---|---|
| 0052713 | 6/1982 | European Pat. Off. |
| 0346039 | 12/1989 | European Pat. Off. |
| 0459134 | 12/1991 | European Pat. Off. |
| 0472868 | 3/1992 | European Pat. Off. |
| 0553588 | 8/1993 | European Pat. Off. |

*Primary Examiner*—Thomas M. Heckler
*Attorney, Agent, or Firm*—William A. Kinnaman

[57] ABSTRACT

A task scheduler for use in a multiprocessor, multitasking system in which a plurality of processor complexes, each containing one or more processors, concurrently execute tasks into which jobs such as database queries are divided. A desired level of concurrent task activity, such as the maximum number of tasks that can be executed concurrently without queuing of tasks, is defined for each processor complex. Each job is assigned a weight in accordance with the external priority accorded to the job. For each job there is defined a desired level of concurrent; task activity that is proportional to its share of the total weight assigned to all concurrently executing jobs. The jobs are prioritized for execution of awaiting tasks in accordance with the discrepancy between the desired level of multitasking activity and the actual level of multitasking activity for each job. Awaiting tasks are preferentially scheduled from jobs with the largest discrepancy between the desired and actual levels of concurrent task activity and are preferentially assigned to the processor complexes with the largest discrepancy between the desired and actual levels of concurrent task activity. The scheduler attempts to assign each task to a processor for which the task has an affinity or at least neutrality in terms of relative execution speed.

23 Claims, 2 Drawing Sheets

TASK SCHEDULER FOR A MULTIPROCESSOR SYSTEM

This application is a continuation of application Ser. No. 08/148,108, filed Nov. 4, 1993, now abandoned.

CROSS-REFERENCE TO RELATED APPLICATIONS

This application is related to the following commonly owned, concurrently filed applications, the specifications of which are incorporated herein by reference:

T. Borden, I. S. Narang, D. B. Rathi and D. J. Wisneski, "System and Method for Parallel Processing of Complex Read-Only Database Queries", Ser. No. 08/148,091 (Attorney Docket No. KI9-93-011);

J. L. Wolf, P. S. Yu and J. J. Turek, "Method of Performing a Parallel Relational Database Query in a Multiprocessor Environment", Ser. No. 08/148,769 (Attorney Docket No. KI9-93-012).

BACKGROUND OF THE INVENTION

1. Field of the Invention

This invention relates generally to a task scheduler for use in a multitasking, multiprocessor system, especially one used to perform parallel database queries or other parallel operations. More particularly, the invention relates to the real-time scheduling of jobs composed of multiple independent tasks in a system of tightly-coupled processor complexes in such a way that the tasks within jobs tend to be load balanced, job priorities are respected, and no job is unduly starved for processing time.

2. Description of the Related Art

The response time of a complex query consisting of multiple tasks is determined by the completion time of the last task within that query. The problem is to schedule in real time multiple such queries consisting of independent tasks, employing a load-balancing algorithm to minimize the response times of individual queries, while at the same time respecting external query priorities and avoiding undue starvation of any of the queries in the system.

An environment consisting of a plurality of tightly coupled central processor complexes (CPCs), or central electronic complexes (CECs), is assumed. In such an environment, reassignment of a task is not possible once it is scheduled on a particular complex. It is assumed that tasks have estimated execution times, but that these estimates may be less than perfect. It is also assumed that the individual task execution times may be affected by the selection of the complexes to which they are assigned, and by the time periods in which they are active. However, it is assumed that such effects are known only qualitatively, not quantitatively. For queries in which the completion of an initial task is known to be of value to the user, it is endeavored to complete that task at an early opportunity. (An example might be that task which would return the first tuple to the user, if this can be identified.)

SUMMARY OF THE INVENTION

In one aspect, the present invention relates to a method for scheduling tasks in a multitasking system in which a plurality of jobs, each of which comprises one or more tasks, are concurrently executed. A desired level of concurrent task activity is defined for each of the jobs. The actual level of concurrent task activity for each of the jobs is also determined. The jobs are prioritized for execution of awaiting tasks in accordance with the discrepancy between the desired level of concurrent task activity and the actual level of concurrent task activity for each of the jobs. Awaiting tasks are scheduled for execution in accordance with the prioritization of the jobs comprising the tasks so that tasks are preferentially scheduled from jobs with the largest discrepancy between the desired and actual levels of concurrent task activity.

The desired and actual levels of concurrent task activity may correspond respectively to the desired and actual numbers of concurrently executing tasks. Alternatively, these levels may correspond respectively to the desired and actual ratios of the number of concurrently executing tasks for a given job to the number of concurrently executing tasks for all jobs. The actual level of concurrent task activity is preferably averaged over a period of time, such as the period of time that a job has existed in the system.

The jobs may be prioritized in accordance with either the difference between the desired level of concurrent task activity and the actual level of concurrent task activity for each of the jobs or the ratio of these two levels.

The desired level of concurrent task activity defined for a given job may be inversely proportional to the number of jobs concurrently being executed and may be determined in part by an external priority assigned to that job. Preferably, each job is assigned a weight in accordance with the external priority for that job, while the desired level of concurrent task activity defined for a job is proportional to the ratio of the weight assigned to that job and the total weight assigned to all jobs.

Preferably, the tasks of each of the jobs are prioritized relative to one another and are scheduled for execution in accordance with such prioritization. The tasks of a given job are preferably prioritized in decreasing order of estimated completion time. Optionally, however, at least one task may be prioritized over the remaining tasks of the same job, independently of its estimated completion time, while the remaining tasks of that job are prioritized in decreasing order of estimated completion time.

Another aspect of the present invention relates to a method of scheduling tasks in a multitasking system in which a plurality of jobs each comprising one or more tasks are concurrently executed by a plurality of processor complexes, each comprising one or more processors. A desired level of concurrent task activity is defined for each of the processor complexes. The actual level of concurrent task activity for each of the processor complexes is also determined. Awaiting tasks are assigned only to those selected processor complexes whose desired level of concurrent task activity exceeds the actual level of concurrent task activity. A reduced desired level of concurrent task activity below the normal desired level of concurrent task activity is defined for a selected processor complex, thereby to speed the completion of tasks executing on the selected processor complex by inhibiting the assignment of new tasks to the selected complex.

The desired and actual levels of concurrent task activity may correspond respectively to the desired and actual numbers of concurrently executing tasks. The reduced desired level of concurrent task activity is preferably set at or below the actual level of concurrent task activity on the selected processor complex to achieve the desired effect of inhibiting the assignment of new tasks to the complex.

Yet another aspect of the present invention relates to a method for scheduling tasks in a multitasking, multiprocessor system in which a plurality of tasks are concurrently executed on a plurality of processor complexes, each of the tasks having a defined affinity, neutrality or disaffinity for each of the complexes. A determination is made of whether a task currently awaiting execution has an affinity for one of the complexes. If a task currently awaiting execution is determined to have an affinity for one of the complexes, the task is assigned to the complex. Otherwise, a determination is made of whether a task currently awaiting execution has a neutrality for one of the complexes. If a task currently awaiting execution os determined to have a neutrality for one of the complexes, the task is assigned to the complex. Otherwise, the scheduler terminates without assigning a task to a complex.

The scheduler may also terminate after assigning a task to a processor complex. Preferably, the tasks are prioritized relative to one another in accordance with a predetermined scheme and are scanned sequentially in accordance with such scheme to determine their affinity for the complexes. Preferably, the processor complexes are also prioritized relative to one another in accordance with a predetermined scheme and are scanned sequentially for each of the tasks in accordance with such scheme to determine the affinity of the tasks for the complexes.

Preferably, the scheduler sequentially scans task-complex combinations to determine whether a task currently awaiting execution has an affinity or neutrality for one of the complexes. If a task of a scanned task-complex combination has an affinity for the complex of the combination, the task is assigned to the complex and further scanning is terminated. If a task of a scanned task-complex combination has a neutrality for the complex of the combination, the task and complex of the first such combination are marked and scanning is continued. If scanning is completed without finding a task having an affinity for a processor, and if a task and complex have been marked as having neutrality for each other, the marked task is assigned to the marked complex. Otherwise, the scheduler terminates without assigning a task to a complex.

DESCRIPTION OF THE PREFERRED EMBODIMENT

Figure 1:
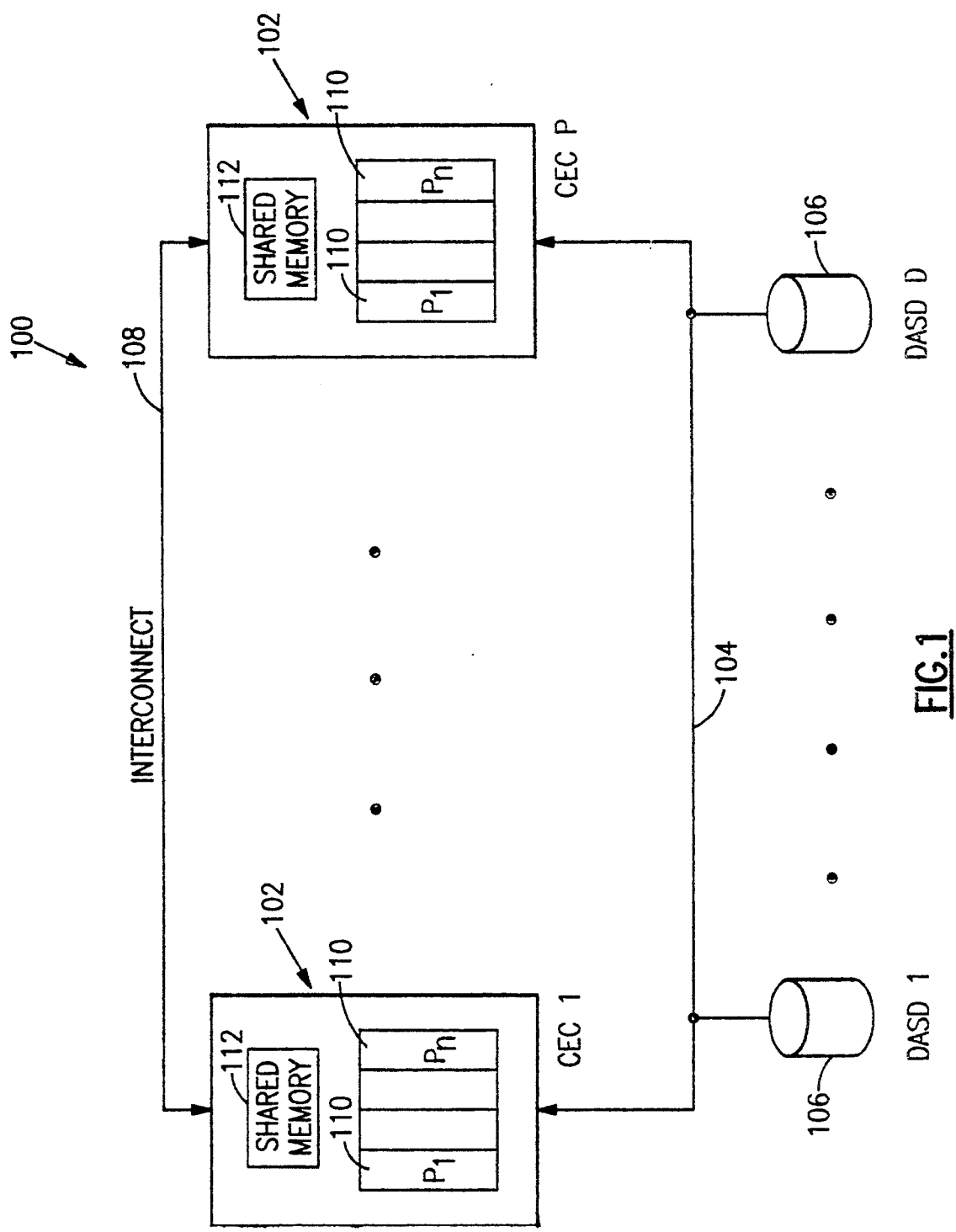
FIG. 1 is a schematic block diagram of a multiprocessor system incorporating the present invention.

Referring to FIG. 1, a multiprocessor system 100 incorporating the present invention includes P central processor complexes (CPCs) or central electronic complexes (CECs) 102. CECs 102 are connected via suitable coupling means 104 to D direct-access storage devices (DASD) 106, which in system 100 are magnetic disks. Each CEC 102 preferably comprises a plurality of processors 110 (e.g., 6 processors per CEC) that are "tightly coupled" to one another in the sense that share a main memory 112. Complexes 102 need not comprise tightly coupled processor complexes, however, and may alternatively comprise uniprocessors. Complexes 102 are "loosely coupled" to one another in the sense that they share devices 106 (i.e., any complex can access any device) but not main memory. In addition to being connected to DASD 106, CECs 102 are interconnected to one another via suitable interconnection means 108.

For the purposes of the present invention, each processor complex 102 is regarded as an indivisible unit. Any suitable means may be used to control the concurrent execution by the individual processors 110 of the tasks assigned to a complex 102. Such means, however, form no part of the present invention.

The CECs 102 are indexed from p=1 to P. The DASD 106 are indexed from d=1 to D. Although the CEC indices p are shown in FIG. 1, they are assigned dynamically rather than statically, as described below. Hence, a given complex 102 may bear a different index number at different times.

Processor complexes 102 are used for the concurrent parallel execution of tasks making up jobs such as database queries, as described below. A job may originate either from one of the processor complexes 102 or from a separate front-end processor as described in the concurrently filed application of T. Borden et al., Ser. No. 08/148,091 (KI9-93-011). As further described in that application, the query splitting and scheduling steps described below may be performed by an additional processor complex or complexes (not shown) similar to complexes 102; such additional complexes would not be counted among the P complexes to which tasks are assigned.

Figures 2, 3, 4:
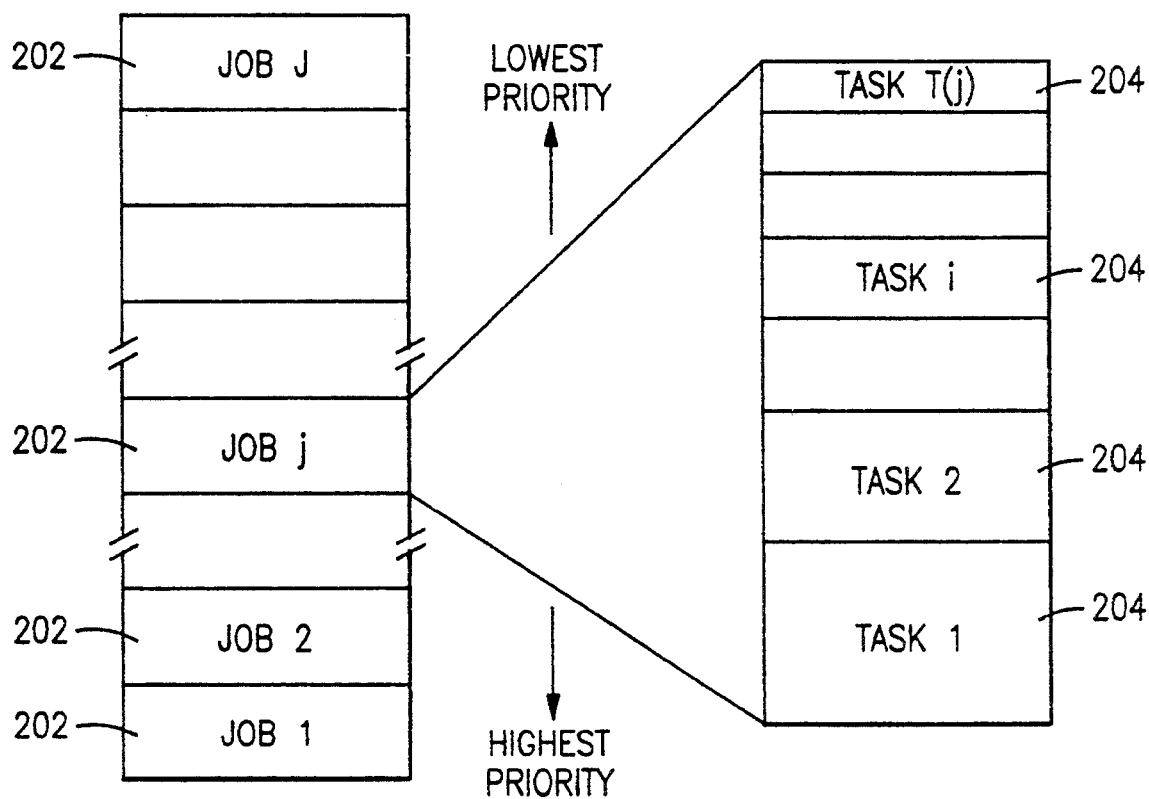
FIG. 2 is a schematic block diagram illustrating the jobs and tasks that are handled by the present invention.
FIGS. 3 and 4 illustrate a pair of database tables that may be the subject of a query processed by the present invention.

Referring to FIG. 2, system 100 is used to concurrently execute one or more jobs 202, each of which has been partitioned into independent tasks 204. As described in our concurrently filed application Ser. No. 08/148,769 (KI9-93-012), each job may comprise a query of data residing on devices 106, as in a relational database manager, while each task may comprise a subquery restricted to particular portions of the tables or relations into which the data is organized.

The jobs 202 are indexed from j=1 to J. The tasks 204 for job j are indexed from i=1 to T(j). In the present embodiment, task indices i are assigned statically on the basis of decreasing estimated task completion time, as described below, so that task 1 of a particular job is the task with the longest estimated completion time. Job indices j, on the other hand, are assigned dynamically on the basis of the desired job priority, so that job 1 is the highest-priority job at a given time. A particular job j, therefore, may have different index number at different stages of processing.

A given job j (202) may enter the system 100 at any of the complexes p (102)—this choice is not under control of the scheduler. The complex p may or may not be the same for each job j. Both initial and final work for the job j will be performed on this particular complex.

Each job j is assigned an external priority level P(j) between 1 and some maximum priority level K. By "external" is meant that the priority level P(j) is not set by the scheduler. In the particular embodiment shown, the external priority level P(j) defined for a job 202 corresponds inversely to the relative weight w(j) of the job, in terms of entitlement to total processing resources, where:

$$w(j) = 1/P(j).$$

Thus, a job with a priority level of 1 will have a relative weight w of 1, whereas a job with a priority level of K has a relative weight of 1/K.

Tasks 204 are independent in the sense that there is no precedence between them. These tasks are under control of the scheduler. They are assumed to have estimated execution times $t(j,1), \ldots, t(j,T(j))$. However, these estimates are assumed imperfect, and derived as if the tasks were executing in a vacuum. In other words, the task times do not take into consideration synergies or interference caused by other currently executing tasks, either from the same job or from other jobs. These synergies or interferences are taken into account, however, in determining the relative affinity of a task 204 for a complex 102, as described below.

Tasks 204 are scheduled in such a manner as to accord each job its weighted share (as determined by the external priority) of the total available processing resources. Jobs 202 receiving less than their weighted share of processing resources are prioritized over jobs receiving more than their weighted share (by dynamically reassigning lower j indices to the former) so that the tasks 204 making up the former jobs are preferentially assigned to available processor complexes 102.

Referring to FIGS. 3 and 4, a typical query may comprise a join operation performed on two database tables (or relations, in relational database terminology) such as tables 300 (EMPLOYEE) and 400 (DEPT). Table 300 (EMPLOYEE) lists for each employee of an organization the employee's name (NAME), the employee's department (DEPT) and the employee's salary (SALARY). Table 400 lists for each department of the organization the department name (DEPT) and the name of the manager of that department (MGR). Each table comprises a plurality of rows, also referred to as records or tuples. Each row in turn comprises one or more columns, also referred to as fields or attributes. Each column of a relation has associated with it a set of possible values which is known as the underlying domain and is independent of the actual values in the column at a given time. In the example given, the domain of each column extends between A (one letter) and ZZZ ... ZZZ (n letters, where n is the maximum field size). In the system 100, the tuples making up the database tables such as tables 300 and 400 are distributed among the storage devices 106, so that different parts of each table generally reside on different devices.

In this particular example, it will be assumed that the query requests a listing by departments of department manager name, department and department manager's salary, ordered by department manager name. Expressed in Structured Query Language (SQL), a language widely used for database queries, this query takes the form:

| 1 | SELECT NAME, EMPLOYEE.DEPT, SALARY |
| 2 | FROM EMPLOYEE, DEPT |
| 3 | WHERE NAME = MGR |
| 4 | ORDER BY NAME |

This type of query is known as a join, and the NAME column of table 300 (EMPLOYEE) and the MGR column of table 400 (DEPT) are known as the join columns.

As described in copending application Ser. No. 08/148,769 (KI9-93-012), this query may be partitioned into independent tasks restricted to particular portions of the tables. Thus, a first such task (task 1) might be limited to those tuples in tables 300 (EMPLOYEE) and 400 (DEPT) whose values in the join columns (NAME, MGR) begin with the letter A:

| 1  | SELECT NAME, EMPLOYEE.DEPT, SALARY |
| 2  | FROM EMPLOYEE, DEPT |
| 3  | WHERE NAME = MGR |
| 3a | AND A $\leq$ NAME < B |
| 3b | AND A $\leq$ MGR < B |
| 4  | ORDER BY NAME |

Task 1 is equivalent to the original query as performed on subsets (or partitions) of the EMPLOYEE and DEPT tables 300 and 400 in which NAME and MGR begin with the letter A.

Other tasks created from the original query would be similar in form to task 1, except that they would be directed to different parts of the EMPLOYEE and DEPT tables. Thus, task 2 might be:

| 1  | SELECT NAME, EMPLOYEE.DEPT, SALARY |
| 2  | FROM EMPLOYEE, DEPT |
| 3  | WHERE NAME = MGR |
| 3a | AND B $\leq$ NAME < C |
| 3b | AND B $\leq$ MGR < C |
| 4  | ORDER BY NAME | while task 26 might be:

| 1  | SELECT NAME, EMPLOYEE.DEPT, SALARY |
| 2  | FROM EMPLOYEE, DEPT |
| 3  | WHERE NAME = MGR |
| 3a | AND NAME $\geq$ Z |
| 3b | AND MGR $\geq$ Z |
| 4  | ORDER BY NAME |

It may be readily verified that these tasks are mutually exclusive and that their results, when merged, replicate the results that would be obtained by performing the original unpartitioned query.

In the partitioning scheme described in copending application Ser. No. 08/148,769 (KI9-93-012), an original join query such as the one illustrated above is partitioned into multiple independent tasks by first partitioning the join column domain of each relation forming part of the query into P equal-size ranges (where P is the number of processor complexes). Each range is in turn partitioned into M subranges of progressively decreasing extent to create a corresponding number of tasks of progressively decreasing estimated task time, resulting in MP tasks from the original query. However, other partitioning schemes could be used to divide a query into independent tasks. Also, as noted above, the jobs that the subject of this specification may be other than database queries.

Each CEC p (102) has an actual multiprogramming level (MPL), defined as the number of tasks 204 concurrently executing on that CEC, of m(p). The maximum allowable MPL for CEC p, beyond which level tasks 204 are no longer assigned to the CEC, is M(p). This level M(p) can be set at the maximum number of concurrent tasks before tasks 204 begin to queue. However, if there exists a job 202 whose only remaining active tasks 204 are on a particular CEC 102, the level M(p) for that CEC can be artificially reduced dynamically in an effort to fence off that CEC, inducing a swifter completion of the job. To accomplish this, the desired MPL M(p) for the complex p is set at or below the actual MPL m(p), so that the complex p is not counted as an available complex to which processors may be assigned.

The task scheduler of the present invention assigns awaiting tasks 204 making up the jobs 202 to available complexes 102. The following key notation, in addition to that already introduced, is employed:

The time of the current invocation of the scheduler is TIME. The time of the last invocation of the scheduler is OTIME.

U(i,j,d) is the number of accesses made to DASD d by task i of job j. The access level at DASD d (the number of accesses to DASD d made by all tasks currently executing in the system) is n(d). The maximum allowable access level at DASD d is N(d). Any one of a number of methods may be used to approximate the number of accesses made to a DASD by a task if more precise information is unavailable. Thus, one measure of the number of accesses made to a DASD by a task is the number of tables relevant to the task that reside on that DASD. This type of information is commonly maintained by database managers, such as the IBM DATABASE 2 ™ (DB2®) relational database manager, in database catalogs that are available to the scheduler. (DATABASE 2 is a trademark, and IBM and DB2 are registered trademarks, of IBM Corporation.)

S(j,i) indicates the assignment and completion status of task i of job j. S(j,i)=p>0 means that task i of job j is currently active on CEC p. S(j,i)=−p<0 means that task i of job j was previously active on CEC p but has completed. S(j,i)=0 means that task i of job j has not yet been assigned a CEC.

ARRIVE(j) is the arrival time of job j. FRACTION(j) is the cumulated "fraction of the action" (a specific measure of concurrent task activity to be defined below) for job j between ARRIVE(j) and TIME. GOAL(j) is the current desired fraction of the action for job j, a function of the priority P(j) and the current time TIME.

In the present embodiment, GOAL(j) is computed by assuming that a job of priority k should have a fraction of the action goal proportional to 1/k. This tends to ensure that a priority 1 job gets k times as much action as a priority k job, and that jobs of the same priority get a comparable amount of action. While this method is assumed for concreteness, it is important to note that the actual method for computing GOAL(j) is independent of the scheduling procedure itself.

The scheduling procedure comprises four routines: MAIN, BOOKKEEP, SEARCH and D_N_A (disaffinity/neutrality/affinity). The main routine (MAIN) essentially acts as a switch which keeps calling itself until no further tasks are assigned to CECs. The routine is as follows:

TABLE 1

| | Main Routine |
|---|---|
| 500 | Procedure: MAIN |
| 501 | Set SUCCESS = 1 |
| 502 | While SUCCESS = 1 do { |
| 503 | Call BOOKKEEP |
| 504 | Call SEARCH |
| 505 | } |
| 506 | End MAIN |

Upon being invoked, the MAIN routine first sets the flag SUCCESS to 1 (step 501). The routine then alternatingly calls the BOOKKEEP and SEARCH routines (steps 503–504) until SUCCESS is reset to zero in the SEARCH routine upon the failure to assign a task 204 to a CEC 102. Upon such event, the MAIN routine suspends (step 506), to be restarted (step 500) whenever a task 204 completes or a new job 202 is submitted to the system 100.

The bookkeeping routine (BOOKKEEP) is used in preparation for the searching routine, which does the actual task-to-CEC assignment. The bookkeeping routine is as follows:

TABLE 2

| | Bookkeeping Routine |
|---|---|
| 600 | Procedure: BOOKKEEP |
| 601 | Set TOTAL1 = 0 |
| 602 | Set TOTAL2 = 0 |
| 603 | For all j = 1 to J do { |
| 604 | Set ACTIVE(j) = 0 |
| 605 | For all i = 1 to T(j) do { |
| 606 | If S(j,i) > 0 then do { |
| 607 | ACTIVE(j)++ |
| 608 | TOTAL1++ |
| 609 | } |
| 610 | } |
| 611 | Increment TOTAL2 by 1/P(j) |
| 612 | } |
| 613 | For all j = 1 to J do { |
| 614 | If TIME = ARRIVE(j) then set FRACTION(j) = 0 |
| 615 | Else set FRACTION(j) = ((OTIME − ARRIVE(j)) × FRACTION(j) + (TIME − OTIME) × (ACTIVE(j)/TOTAL1))/(TIME − ARRIVE(j)) |
| 616 | Set GOAL(j) = 1/(P(j) × TOTAL2) |
| 617 | } |
| 618 | For all p = 1 to P do { |
| 619 | Update M(p) |
| 620 | } |
| 621 | Update S, n, m |
| 622 | Set OTIME = TIME |
| 623 | Determine the number P_POS of CECs p for which M(p) − m(p) > 0 |
| 624 | Index these P_POS CECs by decreasing values of M(p) − m(p) |
| 625 | Index the J jobs by increasing values of FRACTION(j) − GOAL(j) |
| 626 | For all j = 1 to J do { |

TABLE 2-continued

Bookkeeping Routine

| | |
|---|---|
| 627 | Index the T(j) tasks in job j by decreasing values of t(j,i) except for that task, if any, required to have index 1 |
| 628 | } |
| 629 | End BOOKKEEP |

Upon being invoked, the bookkeeping routine first calculates the quantities TOTAL1 and TOTAL2, as well as ACTIVE(j) for each job currently being executed (steps 601-612). In this routine TOTAL1 represents the total number of tasks from all jobs currently being executed, while TOTAL2 represents the combined weights $$W = \sum_{j=1}^{J} w(j) = \sum_{j=1}^{J} 1/P(j)$$

accorded to the various jobs being processed. ACTIVE(j) represents the number of tasks of a job j that are currently being executed.

To calculate these quantities, the routine first initializes quantities TOTAL1 and TOTAL2 at zero (steps 601-602), after which it enters a loop (603-612) which is iterated for each job j. On each iteration of this loop, the routine first sets ACTIVE(j) equal to zero (step 604). The routine then examines the assignment value S(j,i) for each task of job j (step 606), incrementing ACTIVE(j) and TOTAL1 for each task currently being executed (steps 607-608), as indicated by an assignment value S(j,i)>0. Finally, on each iteration of the loop (603-612) the routine increments TOTAL2 by the weight 1/P(j) accorded job j (step 611).

The bookkeeping routine next recalculates the current fraction of the action FRACTION(j) and the desired fraction of the action GOAL(j) for each job j currently being executed (steps 613-617). If a job has just arrived (TIME=ARRIVE(j)), its cumulated fraction of the action FRACTION(j) is set at zero (step 614). Otherwise, the routine recalculates FRACTION(j) in accordance with the formula (step 615):

FRACTION(j) = ((OTIME − ARRIVE(j)) × FRACTION(j) +

(TIME − OTIME) × (ACTIVE(j)/TOTAL1))/ (TIME − ARRIVE(j))

This calculation consists essentially of determining the fraction of the action

ACTIVE (j)/TOTAL1 for the current time interval (OTIME-TIME) and weighting that fraction and the previous cumulative fraction (for the time interval ARRIVE(j)-OTIME) accordance with the respective durations of the time intervals. FRACTION(j) thus represents the fraction of all tasks currently being executed belonging to job j, averaged over the time job j has existed on the system 100.

For each job j, the BOOKKEEP routine next sets the desired fraction of the action GOAL(j) in accordance with the formula (step 616):

GOAL (j)=1/(P(j)×TOTAL2)

As may be seen from this formula, the desired fraction of the action GOAL(j) for a job j is a function of the external priority P(j) assigned to that job and is generally inversely proportional to the total number of jobs J in the system 100 (since TOTAL2 is generally inversely proportional to the total number of jobs J). GOAL(j) thus represents the weighted share (as determined by the external priority) of the total available processing resources allotted to job j.

The bookkeeping routine then updates the maximum allowable MPL M(p) for each CEC p (steps 618-620). This update may include reducing the desired MPL for a selected CEC p to fence off that CEC and thereby speed the completion of tasks executing on that CEC, as described above. The routine thereafter updates S(j,i), n(d) and m(p) to account for newly assigned and newly completed tasks (step 621), and sets OTIME equal to the current value of TIME (step 622).

The routine then determines the number P_POS of CECs p that are operating at an MPL m(p) that is less than the maximum allowable MPL M(p) (step 623); these CECs are currently underutilized and can be assigned additional tasks. The routine prioritizes these CECs, by indexing them by decreasing values of M(p)−m(p), so that the most underutilized CEC (as measured by this criterion) has an index of 1, the next most underutilized CEC has an index of 2, and so forth, with the least underutilized CEC having an index of P_POS (step 624).

The routine thereafter prioritizes the J outstanding jobs, indexing them by increasing values of FRACTION(j)−GOAL(j), so that the most underserved job (as measured by this criterion) has an index of 1, while the most overserved job has an index of J (step 625). The routine then prioritizes the T(j) tasks in each job, by indexing the tasks by decreasing values of estimated task time t(j,i), so that the task with the largest estimated completion time has an index of 1, while the task with the smallest estimated completion time has an index of T(j) (step 626-628). This step of the procedure may be modified to give a particular task an index of 1, regardless of its estimated completion time; this might be desired in a database query application, for example, if a particular task results in the return of a first tuple. Finally, the BOOKKEEP routine terminates (step 629) and returns to the MAIN routine, which immediately thereafter calls the SEARCH routine (step 504).

The searching routine (SEARCH) performs the actual task-to-CEC assignment. Basically, this routine searches through the jobs for a task with affinity for an underutilized CEC, or barring that, for a task which is neutral to an underutilized CEC, if any. The search ordering is on job (outermost loop), task within job (middle loop), and underutilized CEC (innermost loop). The search routine is as follows:

TABLE 3

Search Routine

| | |
|---|---|
| 700 | Procedure: SEARCH |
| 701 | For all j = 1, . . . ,J do { |
| 702 | Set BEST_I = 0 |

TABLE 3-continued

Search Routine

```
703      For all i = 1, . . . ,T(j) do {
704        If S(j,i) = 0 {
705          For all p = 1, . . . ,P_POS do {
706            Switch (D_N_A(j,i,p)) {
707              Case 1: Set S(j,i) = p
708              Return
709              Case 0: If BEST_I = 0 then do {
710                Set BEST_I = i
711                Set BEST_P = p
712              }
713            }
714          }
715        }
716      }
717      If BEST_I > 0 {
718        Set S(j,BEST_I) = BEST_P
719        Return
720      }
721    }
722    Set SUCCESS = 0
723  End SEARCH
```

In the SEARCH routine, all jobs are scanned in the order of their prioritization, and all tasks within jobs in the order of their prioritization, in an attempt to find an awaiting task with an affinity or, failing that, at least a neutrality for an available CEC.

For each job, prior to scanning the tasks of that job, the quantity BEST_I is set to zero (702); BEST_I is a pointer used to identify a task having a neutrality for an available CEC, if such a task is found. When a task is scanned, the quantity S(j,i) corresponding to that task is first examined to determine whether the task is currently awaiting assignment to a CEC complex (703). If the task has already been assigned (S(j,i)≠0), the routine proceeds to the next task.

Otherwise, if the task is awaiting assignment (S(j,i)=0) (704), the affinity value D_N_A(j,i,p) for each CEC p is examined in turn, in the order of their prioritization (by calling the D_N_A routine to be described below), in an attempt to find a CEC for which the task has an affinity or at least a neutrality. If a CEC is found for which the task has an affinity, the task is assigned to that CEC by setting S(j,i)=p (707) and the SEARCH routine is exited (708). If a CEC has been found for which the task has neutrality, and if this is the first such instance for the job being scanned (BEST_I=0) (709), then the task pointer BEST_I is set equal to the task number i (710), while a CEC pointer BEST_P is set equal to the CEC number p (711), to mark the task-CEC pair.

If all of the tasks of a given job have been scanned without finding an awaiting task having an affinity for an available CEC, the quantity BEST_I is examined to determine whether an awaiting task was found with a neutrality for an available CEC (717). If so, that task (BEST_I) is assigned to the available CEC (BEST_P) (718) and the SEARCH routine is exited (719).

If all jobs have been scanned without finding an awaiting task having either an affinity or a neutrality for an available CEC, then the variable SUCCESS is set equal to zero to indicate that the search has been unsuccessful (722), and control returns to the MAIN routine (724). As noted above, resetting SUCCESS to zero causes the MAIN routine to suspend until it is resumed upon the completion of a task or upon the arrival of a new job j.

The disaffinity/neutrality/affinity (D_N_A) routine is invoked by the search routine (step 706) to determine whether a task i (204) in job j (202) has affinity, neutrality or disaffinity for a CEC p (102). A task is said to have an affinity for a given processor if it is expected to execute significantly faster if assigned to that processor than it would have otherwise. Similarly, a task is said to have a disaffinity for a given processor if it is expected to execute significantly slower if assigned to that processor than it would have otherwise. Finally, a task is said to have a disaffinity for a given processor if it is expected to execute at roughly the same speed if assigned to that processor as it would have otherwise.

Any one of a number of criteria, including projected input/output (I/O) contention, possibilities for buffer reuse, and other criteria, may be used to determine the relative affinity of a task 204 for a CEC 102; the particular criteria used do not as such form part of the present invention. In its most general form, the D_N_A routine is as follows:

TABLE 4

D_N_A Routine (Generalized Version)

```
800  Procedure: D_N_A(j,i,p)
801    Set VALUE = 1 if task i in job j has affinity for CEC
         p
802    Set VALUE = 0 if task i in job j is neutral to CEC p
803    Set VALUE = −1 if task i in job j has disaffinity for
         CEC p
804    Return (VALUE)
805  End D_N_A
```

As is evident from the above listing, the D_N_A routine returns (step 804) a value (VALUE) of −1, 0 or 1, depending on whether task i (204) of job j (202) has a disaffinity (step 803), neutrality (step 802) or affinity (step 801) for CEC p (102).

For the sake of an example, a particular version of a D_N_A routine is given in the following listing:

TABLE 5

D_N_A Routine (Particular Version)

```
900  Procedure: D_N_A(j,i,p)
901    Set VALUE = 0
902    For all d = 1 to D do {
903      If U(i,j,d) > 0 then do {
904        If n(d) + U(i,j,d) > N(d) then return (−1)
905        For all ii = 1 to T(j) do {
906          If |S(j,ii)| ≠ p or U(ii,j,d) = 0 then continue
907          If S(j,ii) = −p then set VALUE = 1
908        }
909      }
910    }
911    Return (VALUE)
912  End D_N_A
```

The D_N_A routine of Table 5, like the generalized version of Table 4, returns an affinity value (VALUE) of 1, 0 or −1, depending on whether the task 204 has an affinity, neutrality or disaffinity for the processor complex 102. Upon being called, the D_N_A routine initially sets VALUE to the default value 0 (901). The routine then enters an outer iteration loop (902-910) which it repeats for each DASD d of the system.

On each iteration of the outer loop for a particular DASD d, the routine first determines whether the number of accesses U(i,j,d) made to DASD d by task i of job j is greater than zero (903). If so, then the routine continues the iteration for the current DASD d (903-909); otherwise, the routine proceeds to the iteration for the next DASD. If the routine continues the current iteration, it next determines whether the sum of the current access level n(d) at DASD d and the number of accesses U(i,j,d) made to DASD d by task i of job j is greater than the maximum allowable access level N(d) at DASD d; if so, the routine returns a VALUE of $-1$, indicating that the task i has a disaffinity (904). The returned affinity value of $-1$ causes task i not to be assigned, since it would result in an excessive number of accesses to DASD d. The disaffinity here is for the system 100 as a whole rather than for a particular processor complex 102, since the same excessive number of accesses to DASD d will occur, regardless of the processor complex to which the task is assigned.

If the sum of the current access level n(d) at DASD d and the number of accesses U(i,j,d) made to DASD d by task i of job j is greater than the maximum allowable access level N(d) at DASD d, the routine enters an inner iteration loop (905–908) which it repeats for each task ii of job j. On each iteration of the inner loop for a particular task ii of job j, the routine first determines whether the task ii has been assigned to processor p, as well as whether the task ii accesses DASD d (906). If the task ii has not been assigned to processor p (i.e., $|S(j,ii|)\neq p$), or if the task ii does not access DASD d (i.e., $U(i,j,d)=0$), then the routine proceeds to the iteration for the next task.

Otherwise, the routine completes the iteration for the current task and determines whether the task ii has already been completed by processor p (907). If it has, then the routine sets VALUE equal to 1 to indicate that task i has an affinity for processor complex p. Task i is deemed to have an affinity for the processor complex p since another task ii from the same job j has completed execution on that complex, thereby creating the possibility for buffer reuse. Unlike the disaffinity case described above, this is truly a case of affinity for a particular processor complex p as distinguished from affinity for the system 100 as a whole. The routine does not return at this point, however, but proceeds to the next outer loop iteration, since VALUE can still be reset to $-1$ on a subsequent outer loop iteration at step 904.

Upon completing the outer loop for all DASD (provided it does not end prematurely at step 904), the D_N_A routine returns the finally determined VALUE to the SEARCH routine (911). To recapitulate, the returned VALUE is normally 0 (neutrality), but is $-1$ (disaffinity) if the task makes an excessive number of accesses to a DASD (904), and is 1 (affinity) in the absence of an excessive number of requests to a particular DASD if any other task of the same job has already completed on the same processor complex.

Various additional features can be added to this basic scheme. For example, one could use the total estimated task times assigned to the various systems as a further load balancing constraint. If a task assignment would yield system loads which were too unbalanced, such assignments could be inhibited. Similarly, one could employ a comparable mechanism to guard against job starvation, perhaps increasing the priority of jobs which have received too little processing time.

What is claimed is:

1. In a multitasking system in which a plurality of jobs are concurrently executed, each of said jobs comprising one or more tasks, a method for scheduling said tasks comprising the steps of:

defining a desired level of concurrent task activity for each of said jobs;

determining the actual level of concurrent task activity for each of said jobs;

prioritizing said jobs for execution of awaiting tasks in accordance with the discrepancy between the desired level of concurrent task activity and the actual level of concurrent task activity for each of said jobs; and scheduling said awaiting tasks for execution in accordance with the prioritization of the jobs comprising said tasks so that tasks are preferentially scheduled from jobs with the largest discrepancy between said desired and actual levels of concurrent task activity.

2. The method of claim 1 wherein said desired and actual levels of concurrent task activity correspond respectively to the desired and actual numbers of concurrently executing tasks.

3. The method of claim 1 wherein said desired and actual levels of concurrent task activity correspond respectively to the desired and actual ratios of the number of concurrently executing tasks for a given job to the number of concurrently executing tasks for all jobs.

4. The method of claim 1 wherein said actual level of concurrent task activity is averaged over a period of time.

5. The method of claim 1 wherein said actual level of concurrent task activity is averaged over the period of time that a job has existed in said system.

6. The method of claim 1 wherein said jobs are prioritized in accordance with the difference between the desired level of concurrent task activity and the actual level of concurrent task activity for each of said jobs.

7. The method of claim 1 wherein said jobs are prioritized in accordance with the ratio of the desired level of concurrent task activity to the actual level of concurrent task activity for each of said jobs.

8. The method of claim 1 wherein the desired level of concurrent task activity defined for each of said jobs is inversely proportional to the number of jobs concurrently being executed.

9. The method of claim 1 wherein the desired level of concurrent task activity defined for each of said jobs is a function of an external priority assigned to that job.

10. The method of claim 1 wherein each of said jobs is assigned a weight in accordance with an external priority for that job and wherein the desired level of concurrent task activity defined for a job is proportional to the ratio of the weight assigned to that job and the total weight assigned to all jobs.

11. The method of claim 1 wherein the tasks of each of said jobs are prioritized relative to one another and are scheduled for execution in accordance with such prioritization.

12. The method of claim 11 wherein the tasks of a given job are prioritized in decreasing order of estimated completion time.

13. The method of claim 11 wherein at least one task is prioritized over the remaining tasks of the same job, independently of its estimated completion time, while the remaining tasks of that job are prioritized in decreasing order of estimated completion time.

14. In a multitasking system in which a plurality of jobs are concurrently executed by a plurality of processor complexes, each of said jobs comprising one or more tasks, each of said processor complexes comprising one or more processors, a method of scheduling said tasks comprising the steps of:

defining a normal desired level of concurrent task activity for each of said processor complexes;

determining the actual level of concurrent task activity for each of said processor complexes;

selecting for assignment of awaiting tasks those processor complexes whose desired level of concurrent task activity exceeds the actual level of concurrent task activity;

assigning said awaiting tasks only to those selected processor complexes whose desired level of concurrent task activity exceeds the actual level of concurrent task activity; and defining for a selected one of said processor complexes a reduced desired level of concurrent task activity below said normal desired level of concurrent task activity, thereby to speed the completion of tasks executing on said selected processor complex by inhibiting the assignment of new tasks to said complex.

15. The method of claim 14 wherein said desired and actual levels of concurrent task activity correspond respectively to the desired and actual numbers of concurrently executing tasks.

16. The method of claim 14 wherein said reduced desired level of concurrent task activity is set at or below the actual level of concurrent task activity on said selected processor complex.

17. In a multitasking, multiprocessor system in which a plurality of tasks are concurrently executed on a plurality of processor complexes, each of said tasks having a defined affinity, neutrality or disaffinity for each of said complexes, a method for scheduling said tasks on said complexes comprising the steps of:

(a) determining whether a task currently awaiting execution has an affinity for one of said complexes; and (b) if a task currently awaiting execution is determined to have an affinity for one of said complexes, assigning said task to said complex, otherwise:

(1) determining whether a task currently awaiting execution has a neutrality for one of said complexes; and (2) if a task currently awaiting execution is determined to have a neutrality for one of said complexes, assigning said task to said complex, otherwise, terminating without assigning a task to a complex.

18. The method of claim 17 comprising the further step of terminating after assigning a task to a processor complex.

19. The method of claim 17 in which said tasks are prioritized relative to one another in accordance with a predetermined scheme, said tasks being scanned sequentially in accordance with said prioritization scheme to determine their affinity for said complexes.

20. The method of claim 19 in which said processor complexes are prioritized relative to one another in accordance with a predetermined scheme, said processor complexes being scanned sequentially for each of said tasks in accordance with said prioritization scheme to determine the affinity of said tasks for said complexes.

21. The method of claim 17 in which said processor complexes are prioritized relative to one another in accordance with a predetermined scheme, said processor complexes being scanned sequentially in accordance with said prioritization scheme to determine the affinity of said tasks for said complexes.

22. The method of claim 17 wherein a plurality of jobs are concurrently executed on said processor complexes, each of said jobs comprising one or more of said tasks.

23. In a multitasking, multiprocessor system in which a plurality of tasks are concurrently executed on a plurality of processor complexes, said tasks and said complexes forming task-complex combinations in each of which the task has a defined affinity, neutrality or disaffinity for the complex of the combination, a method for scheduling said tasks on said complexes comprising the steps of:

sequentially scanning task-complex combinations to determine whether any of said tasks currently awaiting execution has an affinity or neutrality for one of said complexes;

if a task of a scanned task-complex combination has an affinity for the complex of the combination, assigning the task to said complex and terminating further scanning;

if a task of a scanned task-complex combination has a neutrality for the complex of the combination, marking the task and complex of the first such combination and continuing scanning;

if scanning is completed without finding a task having an affinity for a processor, assigning the marked task to the marked complex if a task and complex have been marked, otherwise, terminating without assigning a task to a complex.

* * * * *

UNITED STATES PATENT AND TRADEMARK OFFICE
CERTIFICATE OF CORRECTION

PATENT NO. : 5,437,032
DATED : Jul. 25, 1995
INVENTOR(S): Joel L. Wolf, et al.

It is certified that error appears in the above-identified patent and that said Letters Patent are hereby corrected as shown below:

Title page, item [54], and col.1, "MILTIPROCESSOR" should be --MULTIPROCESSOR--.

Signed and Sealed this

Twenty-ninth Day of October 1996

Attest:

BRUCE LEHMAN

*Attesting Officer*  *Commissioner of Patents and Trademarks*